Jan. 23, 1923.
W. C. CHAPMAN.
METALLIC TREAD FOR PNEUMATIC TIRES.
FILED FEB. 8, 1922.
1,443,167.
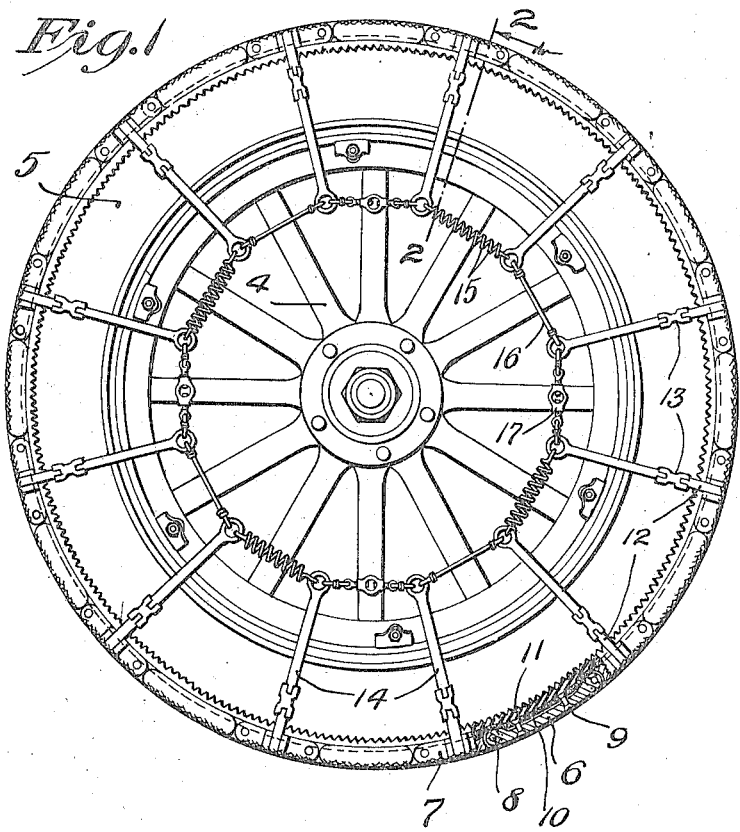
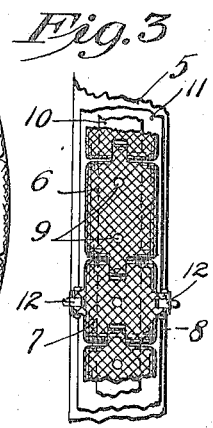
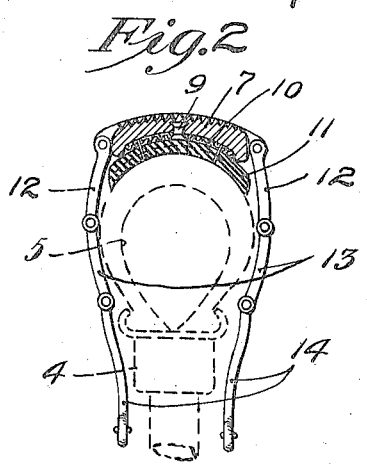
Inventor
William C. Chapman
By his Attorneys
Merchant & Kilgore Patented Jan. 23, 1923.

1,443,167

UNITED STATES PATENT OFFICE.

WILLIAM C. CHAPMAN, OF ST. PAUL, MINNESOTA.

METALLIC TREAD FOR PNEUMATIC TIRES.

Application filed February 8, 1922. Serial No. 535,074.

*To all whom it may concern:*

Be it known that I, WILLIAM C. CHAPMAN, a citizen of the United States, residing at St. Paul, in the county of Ramsey and State of Minnesota, have invented certain new and useful Improvements in Metallic Treads for Pneumatic Tires; and I do hereby declare the following to be a full, clear, and exact description of the invention, such as will enable others skilled in the art to which it appertains to make and use the same.

My invention has for its object to provide a simple and efficient, flexible or articulated, metallic tread for pneumatic tires, and to such ends, generally stated, the invention consists of the novel devices and combinations of devices hereinafter described and defined in the claim.

This tire tread is adapted to be quickly applied and removed from the wheels of motor-propelled vehicles, and when applied, not only saves the tires from wear, but gives the same increased traction and makes the same less liable to skid.

In the accompanying drawings, which illustrate the invention, like characters indicate like parts throughout the several views.

Referring to the drawings:

Fig. 1 is a side elevation with some parts sectioned, illustrating my invention applied to a vehicle wheel that is equipped with a pneumatic tire:

Fig. 2 is a section on the line 2—2 of Fig. 1, some parts being indicated by dotted lines only; and Fig. 3 is a fragmentary plan view showing a portion of the tire tread.

The numeral 4 indicates an automobile wheel equipped with the usual pneumatic tire 5. The tire tread proper is made up of tread plates 6 and 7 alternately connected, in the form of an endless belt, by hinge joints formed by interlapping lugs through which pins 8 are passed.

The tread plates 6 and 7, by rivets 9 or the like, are fastened to a flexible band 10, preferably of heavy canvas, that is set into recesses formed in said plates; and the flexible band 10 is stitched or otherwise secured to a second and wider flexible band 11 preferably made of rubber or canvas and rubber, and the edges of which project beyond the sides of the tread plates. This inner band 11 is intended for direct engagement with a pneumatic tire and it will not only fit itself to irregularities in the surface of the tire but will frictionally hold the metallic tread against creeping movements on the tire.

The tread plates 7, at their side edges, are provided with lugs or ears to which the upper ends of short links 12 are pivoted, and these links 12, as shown, are connected by other links 13 to still longer links 14. The links 14, on both sides of the wheel, are connected by a flexible endless chain, as shown made up of coiled springs 15, wire links 16 and separable turn-button links 17. These anchoring chains are adapted to be uncoupled at any one of the several turn-button links 17, and the bands 10 and 11, if desired, may be sectioned at points in radial line with said separable turn-button links. Also, the metallic tread may be separated substantially at corresponding points or at any one of such points by removal of pin or pins 8. However, the said bands 10 and 11 may be made continuous, in which case, it will be necessary to deflate the pneumatic tire in applying the metallic tread.

The tread plates 6 and 7 may be made in different ways. They will be efficient and wear well when they are cast steel, but may be drop-forged or die-pressed. In any case, they should be provided with serrated or grooved road-engaging faces so that they will be efficient on ice or hard, slippery roads, as well as in sand and mud.

What I claim is:

A detachable tire tread comprising inner and outer relatively wide and narrow bands, respectively, the former being applicable to the tread of a tire, and pivotally connected tread plates supported at their outer circumferential edges on the wide band and having recessed inner surfaces affording a circumferential channel in which the narrow band extends and supports the tread plates thereon, said bands affording a cushion between the tread plates and tire.

In testimony whereof I affix my signature.

WILLIAM C. CHAPMAN.